US008756125B1

(12) United States Patent  
Goode et al.

(10) Patent No.: US 8,756,125 B1  
(45) Date of Patent: Jun. 17, 2014

(54) METHOD AND SYSTEM FOR PROVIDING REMOTE FINANCIAL ASSISTANCE

(75) Inventors: Cathy C. Goode, San Diego, CA (US); Vincent Cheng, San Diego, CA (US); Barrett D. Saik, Cardiff, CA (US)

(73) Assignee: Intuit Inc., Mountain View, CA (US)

( * ) Notice: Subject to any disclaimer, the term of this patent is extended or adjusted under 35 U.S.C. 154(b) by 2208 days.

(21) Appl. No.: 11/496,849

(22) Filed: Jul. 31, 2006

(51) Int. Cl.
*G06Q 10/00* (2012.01)
*G06Q 40/00* (2012.01)

(52) U.S. Cl.
CPC ................................. *G06Q 40/123* (2013.01)
USPC ............................................. 705/31; 705/19

(58) Field of Classification Search
USPC ........................................................ 705/19, 31
See application file for complete search history.

(56) References Cited

U.S. PATENT DOCUMENTS

| | | | |
|---|---|---|---|
| 6,226,623 B1* | 5/2001 | Schein et al. | 705/35 |
| 6,957,186 B1* | 10/2005 | Guheen et al. | 705/323 |
| 7,502,752 B1* | 3/2009 | Lemons et al. | 705/35 |
| 7,668,773 B1* | 2/2010 | Pruitt | 705/36 T |
| 2002/0133410 A1* | 9/2002 | Hermreck et al. | 705/19 |
| 2003/0004856 A1* | 1/2003 | Brown et al. | 705/37 |
| 2004/0078271 A1* | 4/2004 | Morano et al. | 705/19 |
| 2004/0078307 A1* | 4/2004 | Carver | 705/31 |
| 2007/0033116 A1* | 2/2007 | Murray | 705/31 |

* cited by examiner

*Primary Examiner* — Thomas L Mansfield, Jr.
(74) *Attorney, Agent, or Firm* — Osha Liang LLP (57) ABSTRACT

A method for providing remote financial assistance involves obtaining a request from a customer for financial assistance, and scheduling an appointment slot selected from multiple appointment slots, based on the request, where the scheduled appointment slot is associated with a financial professional selected from multiple financial professionals, where the multiple financial professionals are geographically dispersed, and where the financial professional provides remote financial assistance to the customer, in the scheduled appointment slot, by inputting financial information associated with the customer into a financial professional online interface.

19 Claims, 6 Drawing Sheets

METHOD AND SYSTEM FOR PROVIDING REMOTE FINANCIAL ASSISTANCE

BACKGROUND

Due to the complex nature of financial management, many people seek financial assistance from financial professionals. For example, during tax season, many people seek assistance in understanding and/or filing their tax returns. People may also seek financial assistance relating to their banking accounts, credit cards, investments (e.g., stock portfolios, bonds, 401(k) accounts, etc.), insurance claims, or any other similar type of financial matter.

One common method of providing financial assistance involves establishing a "brick-and-mortar" office where customers (i.e., people seeking financial assistance) meet face-to-face with financial professionals. This method requires that the office be in geographic proximity to the customers, and that a sufficient number of financial professionals be present in the office to meet customer demand.

Another common method of providing financial assistance involves establishing a financial assistance call center, where a switchboard routes customer phone calls to financial professionals stationed in the call center. As above, this method also requires that a sufficient number financial professionals be physically located at the call center to answer incoming phone calls from customers.

SUMMARY

In general, in one aspect, the invention relates to a method for providing remote financial assistance, comprising obtaining a request from a customer for financial assistance, and scheduling an appointment slot selected from a plurality of appointment slots, based on the request, wherein the scheduled appointment slot is associated with a financial professional selected from a plurality of financial professionals, wherein the plurality of financial professionals is geographically dispersed, and wherein the financial professional provides remote financial assistance to the customer, in the scheduled appointment slot, by inputting financial information associated with the customer into a financial professional online interface.

In general, in one aspect, the invention relates to a method for providing remote financial assistance, comprising indicating a plurality of available appointment slots, obtaining a scheduled appointment slot selected from the plurality of available appointment slots, via a financial professional online interface, wherein the scheduled appointment slot is associated with a request by a customer for financial assistance, wherein the financial professional online interface is configured to service a plurality of financial professionals, and wherein the plurality of financial professionals is geographically dispersed, and providing remote financial assistance to the customer, in the scheduled appointment slot, by inputting financial information associated with the customer into the financial professional online interface.

In general, in one aspect, the invention relates to a system comprising a server arrangement configured to obtain a request from a customer for financial assistance, schedule an appointment slot selected from a plurality of available appointment slots, based on the request, wherein the scheduled appointment slot is associated with a financial professional selected from a plurality of financial professionals, and wherein the plurality of financial professionals is geographically dispersed, and a financial professional online interface configured to receive financial information input, wherein the financial professional provides remote financial assistance to the customer, in the scheduled appointment slot, by inputting financial information associated with the customer into the financial professional online interface.

In general, in one aspect, the invention relates to a graphical user interface displaying an online interface comprising a schedule panel comprising scheduled appointment information, wherein the scheduled appointment information is associated with a scheduled appointment slot selected from a plurality of available appointment slots, wherein the scheduled appointment slot is associated with a request by a customer for financial assistance, wherein the scheduled appointment slot is further associated with a financial professional selected from a plurality of financial professionals, and wherein the plurality of financial professionals is geographically dispersed, and an active document panel, wherein the financial professional provides remote financial assistance to the customer, in the scheduled appointment slot, by inputting financial information into a financial document in the active document panel.

In general, in one aspect, the invention relates to a computer readable medium comprising executable instruction for providing remote financial assistance by obtaining a request from a customer for financial assistance, and scheduling an appointment slot selected from a plurality of appointment slots, based on the request, wherein the scheduled appointment slot is associated with a financial professional selected from a plurality of financial professionals, wherein the plurality of financial professionals is geographically dispersed, and wherein the financial professional provides remote financial assistance to the customer, in the scheduled appointment slot, by inputting financial information associated with the customer into a financial professional online interface.

In general, in one aspect, the invention relates to a computer readable medium comprising executable instructions for providing remote financial assistance by indicating a plurality of available appointment slots, obtaining a scheduled appointment slot selected from the plurality of available appointment slots, via a financial professional online interface, wherein the scheduled appointment slot is associated with a request by a customer for financial assistance, wherein the financial professional online interface is configured to service a plurality of financial professionals, and wherein the plurality of financial professionals is geographically dispersed, and providing remote financial assistance to the customer, in the scheduled appointment slot, by inputting financial information associated with the customer into the financial professional online interface.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method, system, and graphical user interface to provide remote financial assistance. Specifically, embodiments of invention allow a financial professional to provide remote financial assistance to a customer, using a financial professional online interface. Based on a request from the customer for financial assistance, an appointment slot with the financial professional is scheduled. In the scheduled appointment slot, the financial professional provides financial assistance to the customer by inputting financial information associated with the customer into the financial professional online interface.

Figure 1:
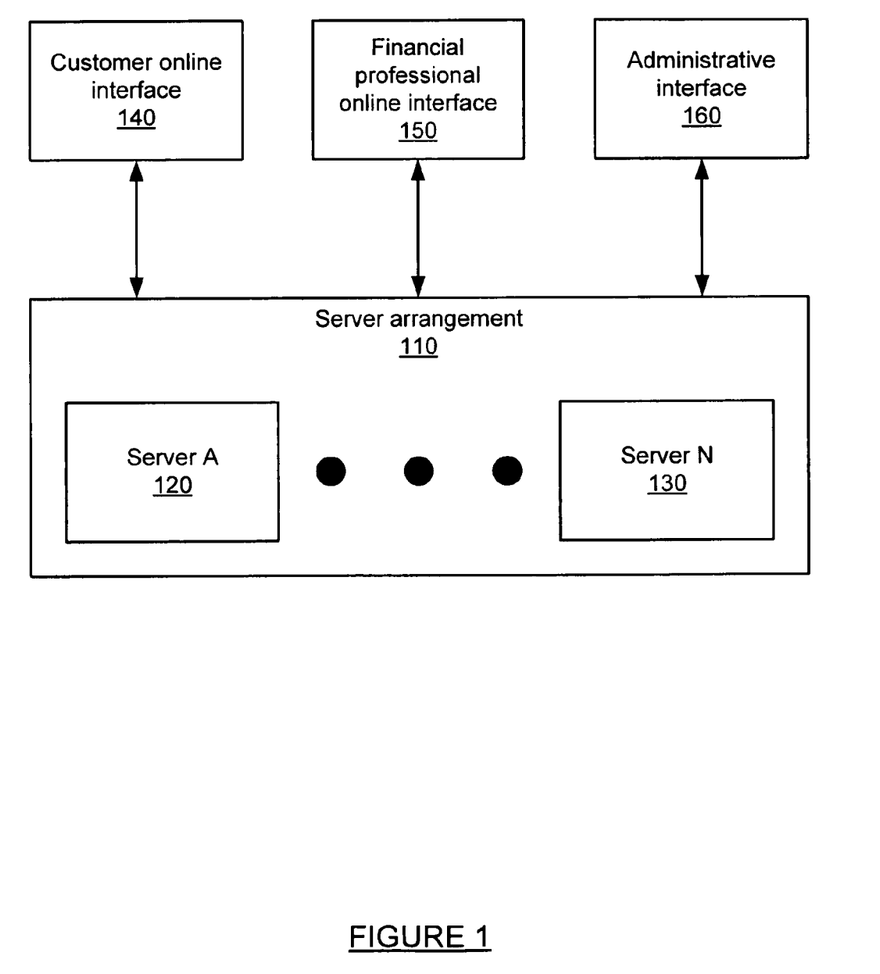
FIG. 1 shows a diagram of a system in accordance with one or more embodiments of the invention.

FIG. 1 shows a diagram of a system in accordance with one or more embodiments of the invention. Specifically, FIG. 1 shows a diagram of a system for providing remote financial assistance in accordance with one or more embodiments of the invention.

In one or more embodiments of the invention, the system may include a customer online interface (140). Specifically, in one or more embodiments of the invention, the customer online interface (140) may be configured to allow customers to schedule appointment slots for financial assistance. For example, the customer online interface (140) may be configured to present a list of available appointment slots (i.e., appointment slots for one or more financial professionals), from which the customer may schedule an appointment slot. In one or more embodiments of the invention, the customer online interface (140) may be a web site, a stand-alone network application, a mobile device application (e.g., a cell phone application, a personal digital assistant (PDA) application, etc.), or any other similar type of interface.

Further, in one or more embodiments of the invention, the customer online interface (140) may be configured to query the customer for information associated with the request for financial assistance. Specifically, in one or more embodiments of the invention, the customer may be asked to input demographic information, financial information, or any other type of information relevant to the request for financial assistance. For example, the customer may be asked to specify the type of financial assistance required, any deadline(s) associated with the request, the customer's physical location (e.g., country, state, county, city, etc.), a banking history, tax data for a current year's tax filing, tax data from a previous year's tax filing, an insurance history, a credit history, or any other similar type of information. In one or more embodiments of the invention, the customer online interface (140) may be configured to obtain information from the customer via input fields (e.g., web site input fields), text messaging (e.g., short message service (SMS)), audio input, video input, a document upload (e.g., a text document, a graphics document, an audio document, a video document, or any other similar type of document), or any other similar type of information source.

In addition, in one or more embodiments of the invention, the customer online interface (140) may be configured to present a filtered list of available appointment slots, based on information obtained from the customer. For example, the list of available appointment slots may be filtered based on the type of financial assistance request, the customer's physical location, etc. Filtering of available appointment slots is discussed in detail below with respect to FIG. 2.

In one or more embodiments of the invention, a customer online interface (140) such as the one described above may facilitate the customer's access to financial assistance. Specifically, the customer online interface (140) may provide a convenient means for entering customer information and/or scheduling appointments, without requiring the customer to physically appear at a brick-and-mortar office and/or place a telephone call.

In one or more embodiments of the invention, the system may include a financial professional online interface (150). Specifically, in one or more embodiments of the invention, the financial professional online interface (150) may be configured to allow a financial professional to indicate available appointment slots. For example, the financial professional online interface (150) may allow the financial professional to enter a range of working hours, from which appointment slots may be scheduled. Alternatively, the financial professional online interface (150) may allow the financial professional to enter specific appointment slots that are available for scheduling. In one or more embodiments of the invention, the financial professional online interface (150) may be a web site, a stand-alone network application, a mobile device application (e.g., a cell phone application, a personal digital assistant (PDA) application, etc.), or any other similar type of interface.

Further, in one or more embodiments of the invention, the financial professional online interface (150) may be configured to provide scheduled appointment slots to the financial professional. Specifically, the financial professional online interface (150) may be configured to inform the financial professional that an appointment slot has been scheduled based on a customer's request for financial assistance. For example, the financial professional online interface (150) may include a web page, or a portion thereof, providing a listing of scheduled appointment slots.

In addition, in one or more embodiments of the invention, the financial professional online interface (150) may be configured to provide information about a customer (i.e., a customer who has scheduled an appointment slot) to the financial professional. For example, the financial professional online interface (150) may provide access to information inputted by the customer via the customer online interface (140). Further, in one or more embodiments of the invention, if the customer has previously received financial assistance, e.g., in a previous appointment, the financial professional online interface (150) may be configured to provide information related to the previous appointment, such as an audio recording of the appointment, a chat log, notes about the previous appointment, financial forms associated with the previous appointment, or any other similar type of information.

Moreover, in one or more embodiments of the invention, the financial professional online interface (150) may include input controls for the financial professional to input financial information associated with the customer's request for financial assistance. For example, if the request for financial assistance is a request for tax filing assistance, the financial professional online interface (150) may include an editable tax form. Alternatively, in one or more embodiments of the invention, the financial professional online interface (150) may include input fields for inputting insurance information, banking information, investment information, or any other similar type of financial information. In one or more embodiments of the invention, inputting financial information into the financial professional online interface (150) may involve adding to, modifying, and/or deleting financial information entered by the customer via the customer online interface (140).

Further, in one or more embodiments of the invention, the financial professional online interface (150) may include one or more controls configured to submit the entered information to a financial authority. For example, if an editable tax form is used, a control may be provided to submit the tax form to a tax authority, such as the Internal Revenue Service (IRS) or any other similar type of financial authority.

In one or more embodiments of the invention, the customer online interface (140) and/or financial professional online interface (150) may be configured to communicate with a server arrangement (e.g., 110). Specifically, in one or more embodiments of the invention, the server arrangement (110) may include one or more servers (e.g., server A (120), server N (130)) configured to provide back-end functionality for the customer online interface and/or financial professional online interface (150). For example, a server (e.g., 120, 130) in the server arrangement (110) may be configured to store information inputted by a customer via the customer online interface (140). Further, a server (e.g., 120, 130) in the server arrangement (110) may be configured to store appointment information for financial professionals using the financial professional online interface (150).

Further, in one or more embodiments of the invention, one or more of the servers (e.g., 120, 130) may include a service configured to deliver content (e.g., web pages, text messages, chat data, video data, audio data, documents, etc.) to and/or from the customer online interface (140) and/or financial professional online interface (150). In one or more embodiments of the invention, the customer online interface (140) and/or financial professional online interface (150) may be configured to communicate with the server arrangement (110) via a cellular network, a wide area network (WAN) (e.g., the Internet), a wireless network, a local area network (LAN), or any other similar type of network. Those skilled in the art will appreciate that in one or more embodiments of the invention, the customer online interface (140) and financial professional online interface (150) may communicate with the server arrangement (110) using different types of networks and protocols.

In one or more embodiments of the invention, the system may also include an administrative interface (160). Specifically, in one or more embodiments of the invention, the administrative interface (160) may be configured to allow an administrator to manage various aspects of the server arrangement (110), customer online interface (140), and/or financial professional online interface (160). For example, in one or more embodiments of the invention, using the administrative interface (160), the administrator may be able to specify display characteristics, enable and/or disable features, add or remove access to the customer online interface (140) or financial professional online interface (150), schedule maintenance tasks for the server(s) (e.g., 120, 130), manage appointment slots, or any other similar type of administrative function. More specifically, in one or more embodiments of the invention, the administrative interface (160) may provide access to a status of a financial professional (e.g., appointment availability, login status, etc.), metrics for the financial professional (e.g., average appointment time, total appointment time, number of appointments completed in a given time period, etc.), and/or real-time monitoring of remote financial assistance currently in progress. In one or more embodiments of the invention, the administrative interface (160) may be a web site, a stand-alone network application, a mobile device application (e.g., a cell phone application, a personal digital assistant (PDA) application, etc.), or any other similar type of interface.

Figure 2:
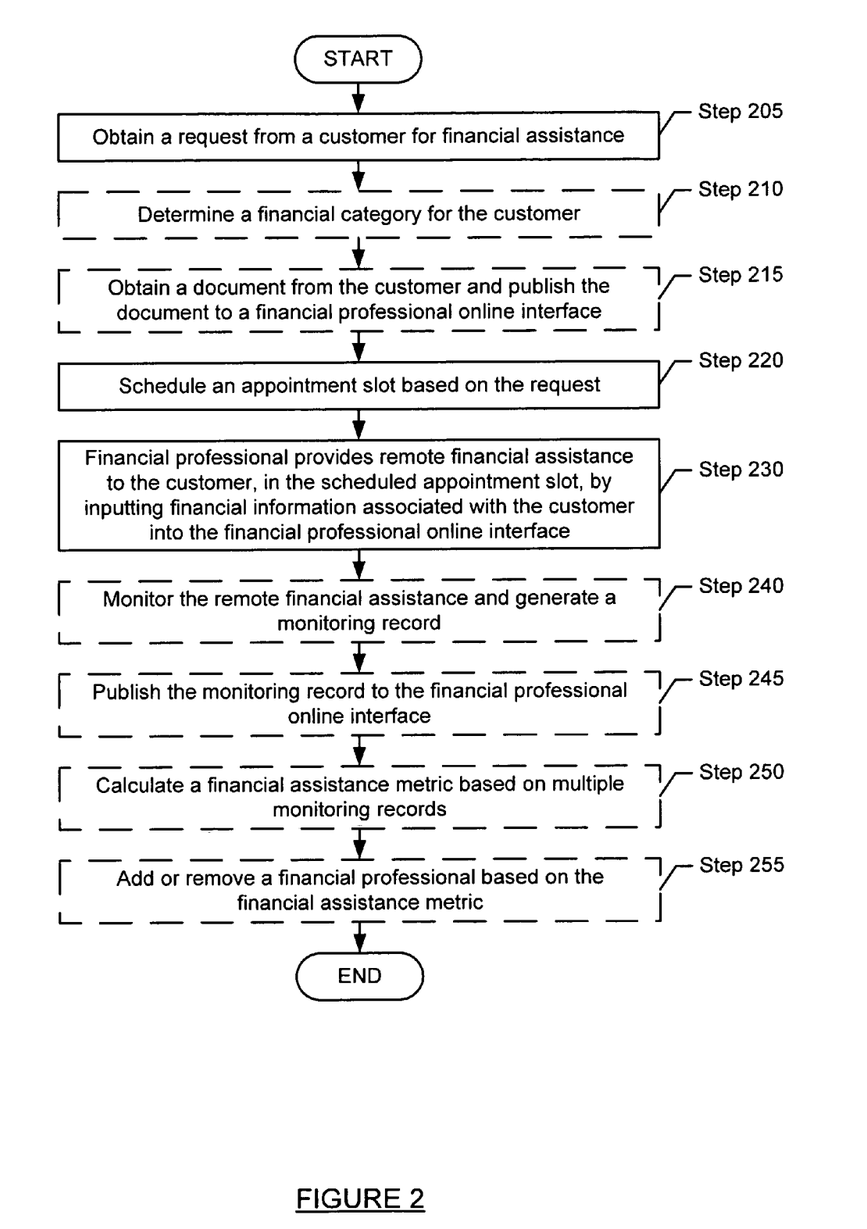
FIGS. 2-3 show a diagram of a flowchart in accordance with one or more embodiments of the invention.

FIG. 2 shows a flowchart in accordance with one or more embodiments of the invention. Specifically, FIG. 2 shows a flowchart of a method for providing remote financial assistance in accordance with one or more embodiments of the invention. In one or more embodiments of the invention, one or more of the steps described below may not be required, may be performed in a different order than the order shown in FIG. 2, and/or may be repeated. Accordingly, those skilled in the art will appreciate that the specific arrangement of steps shown in FIG. 2 is provided for exemplary purposes only, and should not be construed as limiting the scope of the invention.

In one or more embodiments of the invention, in Step 205, a request from a customer for financial assistance may be obtained. For example, in one or more embodiments of the invention, the request for financial assistance may be obtained via a customer online interface, as described above. Alternatively, in one or more embodiments of the invention, the request for financial assistance may be obtained via telephone, email, facsimile (fax) or any other similar type of communications channel. In one or more embodiments of the invention, requesting financial assistance may simply involve accessing an interface for scheduling an appointment slot for financial assistance. Scheduling an appointment slot is discussed in detail below.

In one or more embodiments of the invention, in Step 210, a financial category for the customer may be determined. As discussed above, in one or more embodiments of the invention, the customer may provide information associated with the request for financial assistance, such as demographic information, financial information, etc. Accordingly, in one or more embodiments of the invention, the category for the customer may be determined based on the aforementioned information. For example, the customer may be categorized as a loan-bearing customer, a bankrupt customer, a small business customer, a large business customer, a customer from a specific geographic location, or any other similar type of categorization. As a further example, if the financial assistance relates to a tax filing, the customer may be categorized based on the type of tax return to be filed (e.g., a simple tax return, a complex tax return, a tax return having specific schedules attached, etc.). In one or more embodiments of the invention, categorizing a customer in this manner may allow remote financial assistance to be tailored to the customer's specific needs. For example, available appointment slots may be filtered based on the customer's information. Filtering appointment slots is discussed in detail below.

In one or more embodiments of the invention, in Step 215, one or more documents may be obtained from the customer and published to a financial professional online interface. For example, as discussed above, a document may be obtained via a customer online interface. Further, in one or more embodiments of the invention, the document may be a text document, a graphics document, an audio document, a video document, a facsimile (fax) document, or any other similar type of document. In one or more embodiments of the invention, the document may include an identifying mark associated with the customer (e.g., a barcode, a customer number, etc.) and the document may be associated with the customer based on the identifying mark. For example, the customer may be able to print a document that includes the identifying mark, enter information into the document, and fax the document to a designated location. Continuing with the example, once the document is received at the designated location, the document may be associated with the customer based on an electronic recognition of the identifying mark In one or more embodiments of the invention, publishing the document to the financial professional online interface may involve making the document available for access by a financial professional, via the financial professional online interface (e.g., as a menu item, a hyperlink, an icon, etc.). In one or more embodiments of the invention, publishing such documents to the financial professional online interface may ensure that the documents are readily available to any financial professional advising the customer.

In one or more embodiments of the invention, in Step 220, an appointment slot may be scheduled based on the customer's request for financial assistance. For example, as discussed above, the customer may use a customer online interface to select an appointment slot from a list of available appointment slots. Alternatively, the appointment slot may be scheduled automatically (i.e., using a scheduling algorithm) based on information provided by the customer. Moreover, in one or more embodiments of the invention, the appointment slot may be scheduled based on a telephone call, an email, a facsimile (fax), or any other similar type of communication from the customer.

Further, in one or more embodiments of the invention, the specific appointment slots available for scheduling in Step 220 may be filtered based on information entered by the customer. Specifically, appointment slots for multiple financial professionals may exist, and appointment slots for one or more of the financial professionals may be filtered out based on the customer's information. For example, if the customer is located in a particular state, appointment slots for financial professionals located in different states may not be available. As another example, if the customer is a small business customer, then only appointment slots for financial professionals specializing in small business finances may be available. Those skilled in the art will appreciate that many different types of filters may be used, and that filtering available appointment slots in this manner may allow for the customer to receive specialized (i.e., based on a specialty of the financial professional) financial advice.

Further, in one or more embodiments of the invention, the available appointment slots may be filtered based on the work status of one or more financial professionals. Specifically, in one or more embodiments of the invention, the available appointment slots may be filtered based on how many scheduled appointment slots are already associated with a financial professional, a volume of uncompleted work (i.e., a workload backlog associated with other customers), or any other similar factor. More specifically, in one or more embodiments of the invention, the financial professional may be limited to a maximum number of appointments in a given time period and/or may be restricted from accepting new appointments until the backlog is reduced. Said another way, the financial professional's work time may effectively be buffered. Those skilled in the art will appreciate that filtering available appointment slots in this manner may ensure that financial professionals only accept new appointments that they can handle in a timely manner, may reduce delays in completing financial assistance for existing customers, and may improve customer satisfaction by reducing the number of delayed appointments.

In one or more embodiments of the invention, in Step 230, a financial professional may provide remote financial assistance to the customer, in the scheduled appointment slot. Specifically, in one or more embodiments of the invention, the financial professional may input financial information associated with the customer into a financial professional online interface. In one or more embodiments of the invention, the financial professional may speak with the customer via a telephone connection, and input the financial information during or after the telephone conversation. Further, in one or more embodiments of the invention, the telephone connection may be a Voice over Internet Protocol (VoIP) connection, and may be accessed as part of the financial professional online interface.

In one or more embodiments of the invention, inputting financial information into the financial professional online interface may involve editing (i.e., adding to, modifying, and/or deleting) financial information provided by the customer. Specifically, in one or more embodiments of the invention, the financial information being added to, modified, and/or deleted may be provided by the customer via a customer online interface. Accordingly, one or more embodiments of the invention may allow for efficient collaboration between the customer and the financial professional.

Those skilled in the art will appreciate that the financial assistance is herein referred to as "remote" because the financial professional may be working from any geographic location where the financial professional online interface is available. For example, in one or more embodiments of the invention, the financial professional may be located in any office, building, subdivision, neighborhood, city, county, state, country, etc. where the financial professional online interface is available. Further, in one or more embodiments of the invention, different financial professionals accessing the financial professional online interface may be located in different offices, buildings, building subdivisions, neighborhoods, cities, counties, states, countries, etc.

Further, those skilled in the art will appreciate that allowing for remote financial assistance may facilitate a financial company's ability to serve its customers. For example, if the remote financial assistance involves tax filing assistance, the company may be able to contract additional financial professionals during tax season, without the burden of providing central office space (i.e., a brick-and-mortar office and/or a centralized call center) for all of the financial professionals. Moreover, in one or more embodiments of the invention, allowing for remote financial assistance may allow a financial company to hire specialists in different geographic areas (e.g., financial professionals specializing in particular states, counties, etc.) with minimal financial and/or administrative overhead. In one or more embodiments to the invention, the term remote (as used herein) involves providing financial assistance from afar (i.e., through an online interface).

Moreover, those skilled in the art will appreciate that allowing for remote financial assistance may facilitate task force management. For example, the financial professionals may be independent contractors; accordingly, a financial company may only be required to pay the financial professionals for time associated with scheduled appointment slots.

In one or more embodiments of the invention, in Step 240, the remote financial assistance may be monitored, and a monitoring record may be generated. For example, a monitoring record may be generated indicating the duration of the remote financial assistance, an audio recording of the remote financial assistance, a chat log associated with the remote financial assistance, the financial professional's specialty, a customer satisfaction rating, an outcome of the remote financial assistance, or any other similar property of the remote financial assistance.

In one or more embodiments of the invention, in Step 245, a monitoring record generated according to Step 240 may be published to the financial professional online interface. For example, if the monitoring record includes an audio recording of the remote financial assistance, the audio recording may be published to the financial professional online interface. Those skilled in the art will appreciate that publishing such information (e.g., audio, video, text, customer satisfaction, etc.) may be useful for any financial professional providing remote financial assistance to the same customer in the future.

Further, in one or more embodiments of the invention, in Step 250, a financial assistance metric may be calculated, based on multiple monitoring records (i.e., monitoring records such as the one generated in Step 240). Specifically, the multiple monitoring records may be associated with only a single financial professional, or with multiple financial professionals (e.g., all financial professionals using the financial professional online interface, financial professionals having a particular specialty, financial professionals in a particular region, etc.). For example, a financial assistance metric may be generated indicating overall customer satisfaction with remote financial assistance provided in a particular geographic region.

In one or more embodiments of the invention, in Step 255, a financial assistance metric (i.e., a financial assistance metric such as the one calculated in Step 255) may be used to determine whether to add or remove financial professionals. For example, if the financial assistance metric indicates that financial assistance is commonly requested for a specific type of tax return, a decision may be made to hire additional financial professionals specializing in that type of tax return. As another example, if the financial assistance metric indicates that few people in a particular geographic region are requesting remote financial assistance, fewer financial professionals may be needed in that region. Alternatively, if the financial assistance metric indicates that demand for remote financial assistance outstrips the supply of financial professionals, a decision may be made to hire additional financial professionals.

Stated more generally, in one or more embodiments of the invention, staffing of the financial professionals may be modified so that the financial professionals' skills and/or availability correspond to the type and/or volume of financial assistance being requested. Those skilled in the art will appreciate that using a financial assistance metric in this manner may provide a more specialized work force, facilitate work force management, spare a financial company the burden of unneeded employee/contractor overhead, and/or allow the financial company to efficiently respond to changing demand for remote financial assistance.

Figure 3:
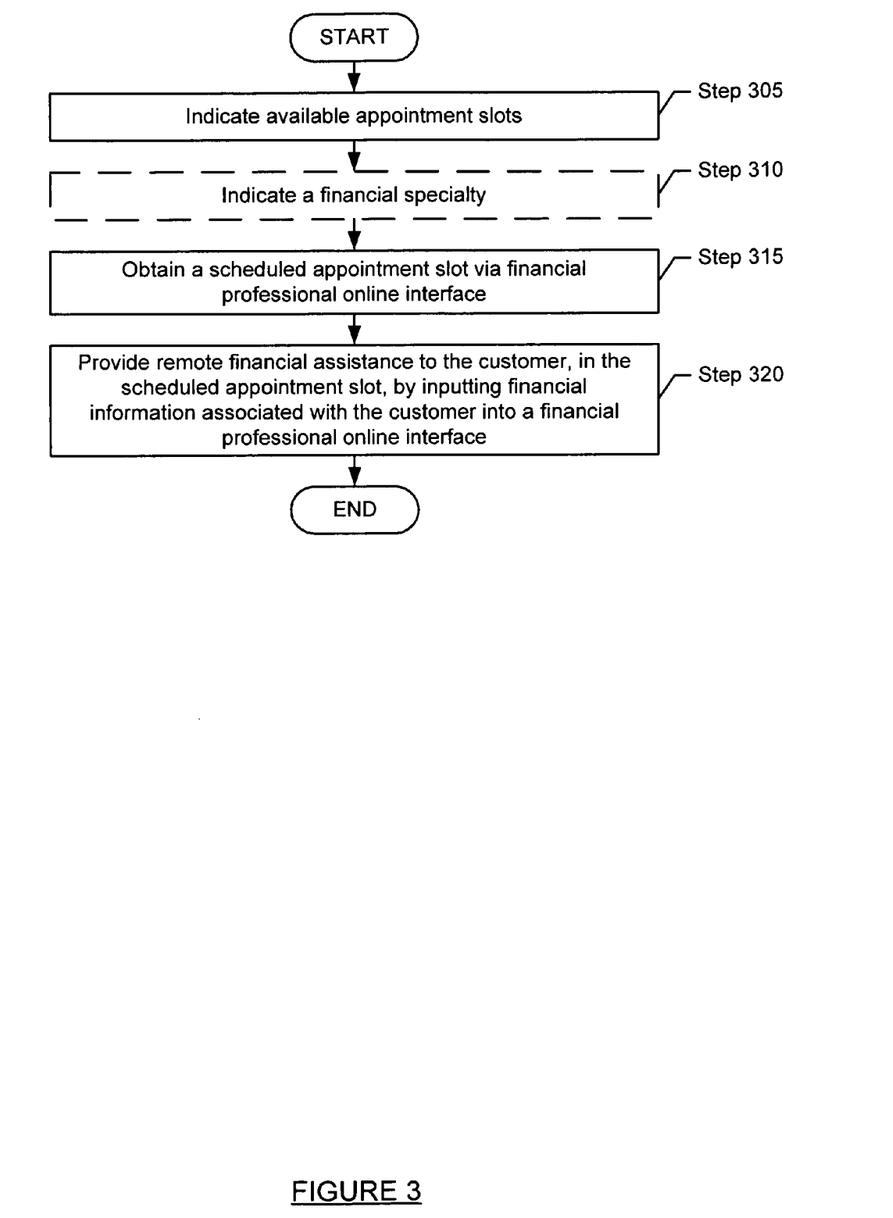

FIG. 3 shows a flowchart in accordance with one or more embodiments of the invention. Specifically, FIG. 3 shows a flowchart of a method for providing remote financial assistance in accordance with one or more embodiments of the invention. In one or more embodiments of the invention, one or more of the steps described below may not be required, may be performed in a different order than the order shown in FIG. 3, and/or may be repeated. Accordingly, those skilled in the art will appreciate that the specific arrangement of steps shown in FIG. 3 is provided for exemplary purposes only, and should not be construed as limiting the scope of the invention.

In one or more embodiments of the invention, in Step 305, available appointment slots may be indicated. Specifically, in one or more embodiments of the invention, times in which a financial professional is available to provide remote financial assistance may be indicated. For example, as described above, the financial professional may have a range of work hours in which appointment slots are available. In one or more embodiments of the invention, the available appointment slots may be indicated by the financial professional using a financial professional online interface.

In one or more embodiments of the invention, in Step 310, a financial specialty for the financial professional is indicated. Specifically, in one or more embodiments of the invention, the financial specialty may be indicated via telephone, facsimile (fax), email, a financial professional online interface, or any other similar type of communications channel. For example, the specialty may indicate that the financial professional specializes in finances for a particular geographic region, a particular category of customer (e.g., small business, large business, bankruptcy, etc.), a particular type of financial advice (e.g., taxes, insurance, investing, banking, etc.), or any other similar type of specialty.

In one or more embodiments of the invention, in Step 315, a scheduled appointment slot is obtained. Specifically, in one or more embodiments of the invention, the scheduled appointment slot is associated with a request for financial assistance by a customer (i.e., a customer of a financial company and/or the financial professional). More specifically, in one or more embodiments of the invention, the scheduled appointment slot may be obtained via a financial professional online interface. In other words, the financial professional online interface may be configured to indicate that the appointment slot has been scheduled.

In one or more embodiments of the invention, in Step 320, the financial professional provides remote financial assistance to the customer, in the scheduled appointment slot, by inputting financial information associated with the customer into the financial professional online interface. Various aspects of providing remote financial assistance to a customer are discussed in detail above.

In one or more embodiments of the invention, the method of FIG. 3, described above, provides an efficient process for a financial professional to indicate appointment availability and subsequently provide remote financial assistance to a customer, without requiring the financial professional to physically travel to a location where the financial assistance is to be provided.

Figure 4:
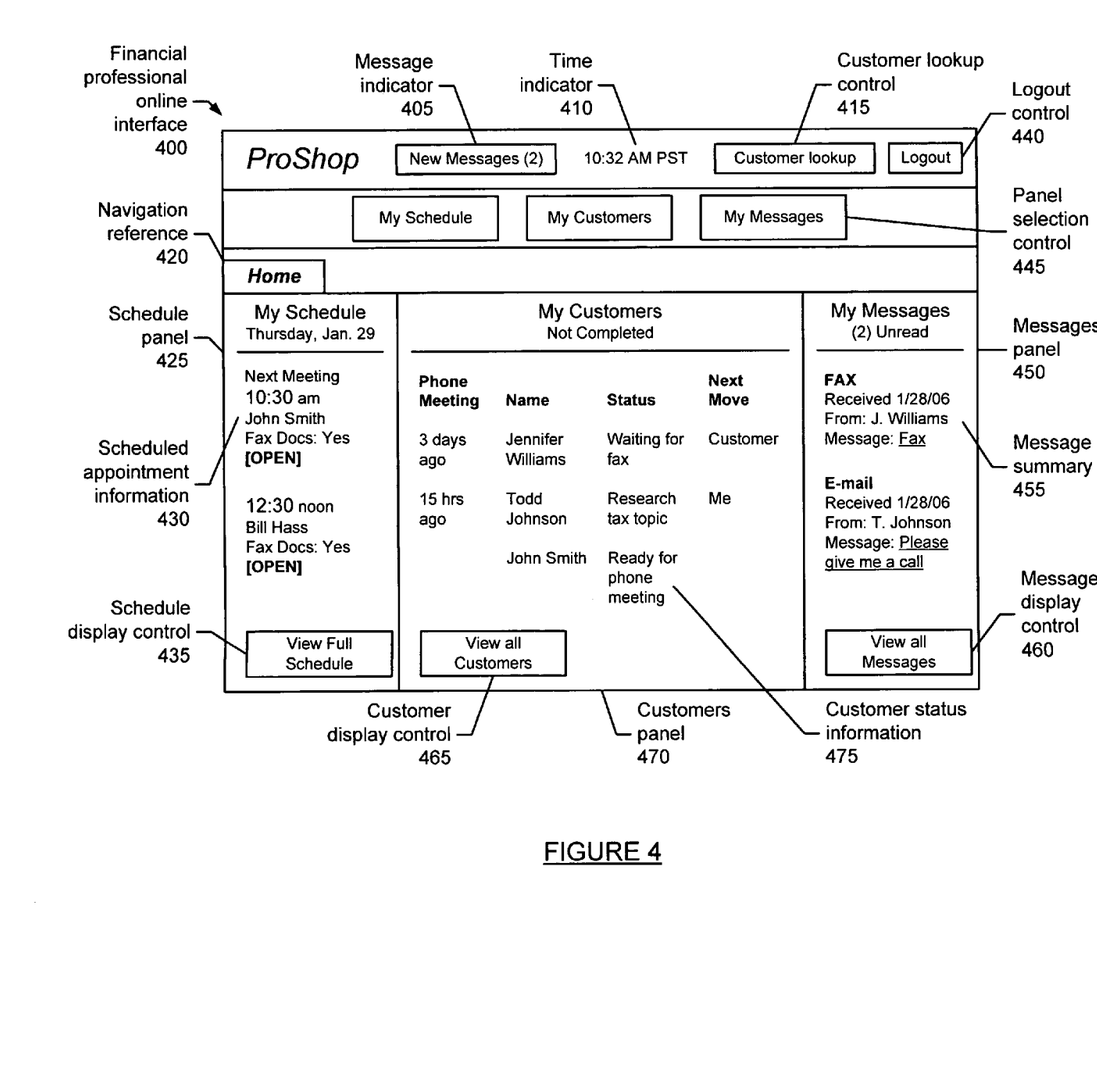
FIGS. 4-5 show a diagram of a graphical user interface in accordance with one or more embodiments of the invention.
Figure 5:
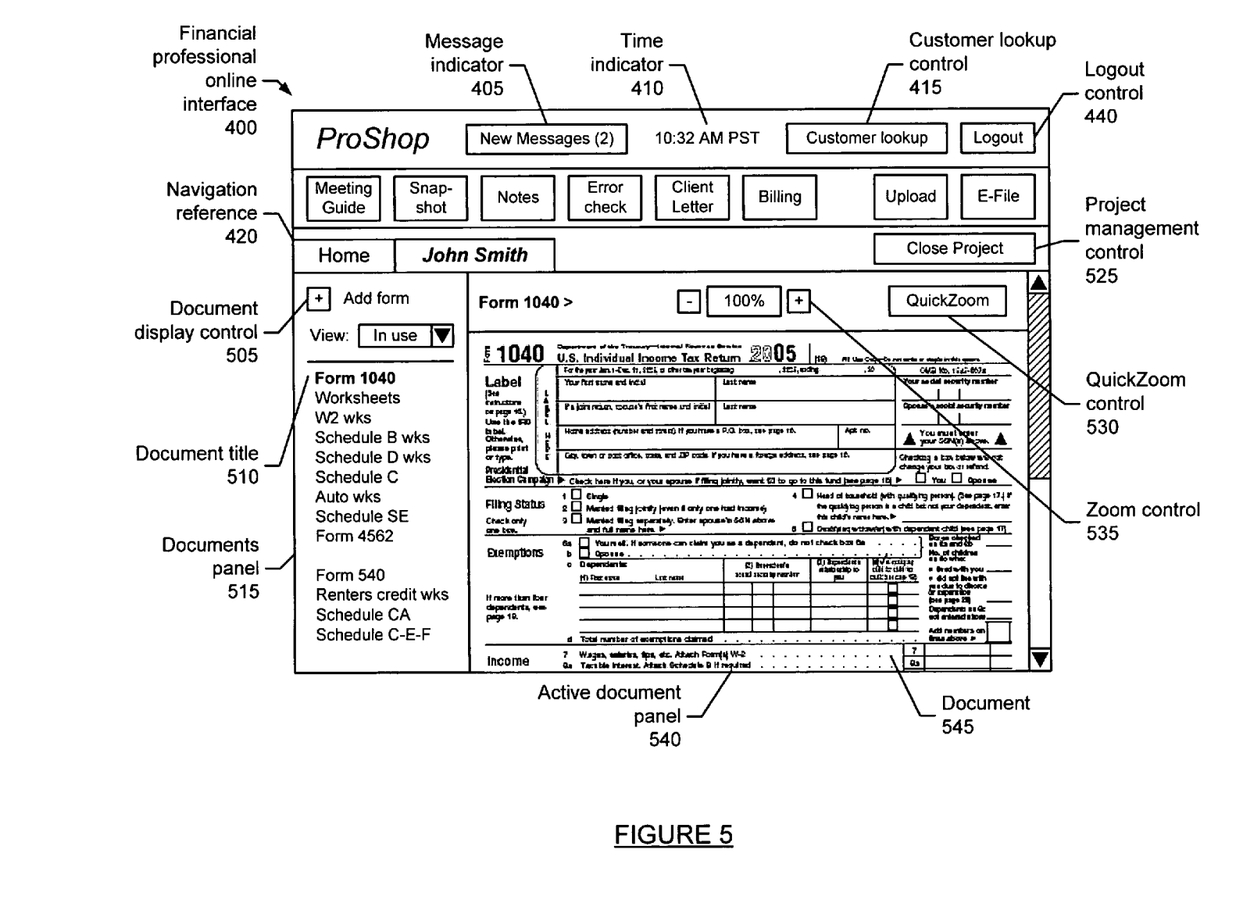

FIGS. 4-5 show a diagram of a graphical user interface in accordance with one or more embodiments of the invention. Specifically, FIGS. 4-5 show a diagram of a financial professional online interface (400) for providing remote financial assistance in accordance with one or more embodiments of the invention. In one or more embodiments of the invention, one or more of the elements described below may not be present, may have a different appearance than that shown, and/or may be arranged differently relative to each other. Accordingly, those skilled in the art will appreciate that the specific elements shown in FIGS. 4-5 are provided for exemplary purposes only, and should not be construed as limiting the scope of the invention.

In one or more embodiments of the invention, the financial professional online interface (400) may include a schedule panel (e.g., 425). Specifically, in one or more embodiments of the invention, the schedule panel (e.g., 425) may include scheduled appointment information (e.g., 430) providing information about scheduled appointment slots (i.e., appointment slots scheduled in association with customers' requests for financial assistance). In one or more embodiments of the invention, the scheduled appointment information (e.g., 430) may include an appointment time, a customer name, customer status information (e.g., whether required documents and been received and/or sent by the customer), or any other similar type of appointment information.

Further, in one or more embodiments of the invention, different views of the schedule panel (e.g., 425) may be possible. For example, scheduled appointment information (e.g., 430) may be available for a particular date, a range of dates, an individual customer, customers in a particular category, all scheduled appointments, etc. Accordingly, in one or more embodiments of the invention, the schedule panel (e.g., 425) may include one or more schedule display controls (e.g., 435) configured to change the view of the schedule panel (e.g., 425).

In one or more embodiments of the invention, the financial professional online interface (400) may include a customers panel (e.g., 470). Specifically, in one or more embodiments of the invention, the customers panel (e.g., 470) may include customer status information (e.g., 475) associated with customers serviced by the financial professional. For example, the customer status information (e.g., 475) may include a time of a past or future appointment for remote financial assistance, a name of the customer, a status of the customer (e.g., whether required documents and been received and/or sent by the customer), a current responsibility indicator (i.e., whether the customer or the financial professional is currently responsible for advancing the status of the remote financial advice), or any other similar type of status information.

Further, in one or more embodiments of the invention, different views of the customers panel (e.g., 470) may be possible. For example, customer status information (e.g., 475) may be available for a particular category of customers, customers whose remote financial assistance is not yet complete, customers serviced on a specific data, customers grouped by status, all customers, etc. Accordingly, in one or more embodiments of the invention, the customers panel (e.g., 470) may include one or more customer display controls (e.g., 465) configured to change the view of the customers panel (e.g., 470).

In one or more embodiments of the invention, the financial professional online interface (400) may include a messages panel (e.g., 450). Specifically, in one or more embodiments of the invention, the messages panel (e.g., 450) may include one or more message summaries (e.g., 455) for messages received and/or sent to customers. For example, a message summary (e.g., 455) may include the type of message (i.e., voicemail, email, text message, facsimile (fax), etc.), a date and/or time when the message was received or sent, whether the message has been read, a recipient and/or sender of the message, a link to additional information about the message (e.g., the full contents of the message), etc.

Further, in one or more embodiments of the invention, different views of the messages panel (e.g., 440) may be possible. For example, message summaries (e.g., 455) may be available for messages received and/or sent on a particular date, unread messages, deleted messages, messages that have been responded to, messages of a particular type, all messages, etc. Accordingly, in one or more embodiments of the invention, the messages panel (e.g., 450) may include one or more message display controls (e.g., 460) configured to change the view of the messages panel (e.g., 450).

In one or more embodiments of the invention, the specific panel(s) shown may be configurable. Specifically, in one or more embodiments of the invention, the financial professional online interface (400) may include one or more panel selection controls (e.g., 445) for activating and/or deactivating specific panels. Further, in one or more embodiments of the invention, the financial professional online interface (400) may include a navigation reference (e.g., 420) indicating a navigation context for the financial professional online interface (400). Specifically, the navigation reference (e.g., 420) may indicate which functional area of the financial professional online interface (400) is currently shown.

In one or more embodiments of the invention, the financial professional interface (400) may include a message indicator (e.g., 405) indicating whether any new and/or unread messages exist. Further in one or more embodiments of the invention, the financial professional interface (400) may include a time indicator (e.g., 410) indicating the current time and/or date. In one or more embodiments of the invention, the time indicator (e.g., 410) may indicate the time at the financial professional's location, the time at a customer's location, or both.

Further, in one or more embodiments of the invention, the financial professional online interface (400) may include a customer lookup control (e.g., 415) configured to open a search interface (not shown) wherein search criteria may be entered to search for customers. In one or more embodiments of the invention, the customer lookup control (e.g., 415) may be a button, a hyperlink, an image, a menu item, a textbox, or any other similar type of control (not shown).

Further, in one or more embodiments of the invention, the financial professional online interface (400) may include a logout control (e.g., 440) for exiting the financial professional online interface (400). In one or more embodiments of the invention, the logout control (e.g., 440) may be a button, a hyperlink, an image, a menu item, a textbox, or any other similar type of control (not shown).

In one or more embodiments of the invention, one or more of the features of the financial professional online interface (400) described above may allow a financial professional to customize the visual appearance of the financial professional online interface (400) so as to maximize work efficiency. Specifically, the financial professional may be able to enable, disable, and/or modify the display of specific panels in a manner best suited to the financial professional's work requirements.

Turning now to discussion of FIG. 5, in one or more embodiments of the invention, the financial professional online interface (400) may include a documents panel (e.g., 515). Specifically, in one or more embodiments of the invention, the documents panel (e.g., 515) may include one or more document titles (e.g., 510) of documents (e.g., 545) available to view and/or edit in the financial professional online interface (400). In one or more embodiments of the invention, selecting (e.g., using a mouse, voice command, keystroke, or any other similar type of input) a document title (e.g., 510) may result in the associated document (e.g., 545) being shown in an active document panel (e.g., 540). The active document panel (e.g., 540) is discussed in detail below.

Further, in one or more embodiments of the invention, different views of the documents panel (e.g., 515) may be possible. For example, document titles (e.g., 510) may be available for documents (e.g., 545) received on a particular date, documents (e.g., 545) of a specific type (e.g., forms, facsimiles (faxes), worksheets, audio documents, video documents, etc.). Further, in one or more embodiments of the invention, it may be possible to add and/or remove document titles (e.g., 510) shown in the documents panel (e.g., 515). Accordingly, in one or more embodiments of the invention, the documents panel (e.g., 515) may include one or more document display controls (e.g., 505) configured to change the view of the documents panel (e.g., 515).

In one or more embodiments of the invention, the financial professional online interface (400) may include an active document panel (e.g., 540). Specifically, in one or more embodiments of the invention, the active document panel (e.g., 540) may be configured to show the contents of a document (e.g., 545) selected in a documents panel (e.g., 515). More specifically, in one or more embodiments of the invention, the document (e.g., 545) shown in the active document panel (e.g., 540) may be editable. In other words, the financial professional may be able to enter data (e.g., text, audio, video, an image, etc.) into the document (e.g., 545) as part of the remote financial assistance provided to a customer.

In one or more embodiments of the invention, to facilitate viewing and/or editing of the document (e.g., 545), the active document panel (e.g., 540) may include one or more zoom controls (e.g., 535) for increasing and/or decreasing the visual presentation size of the document (e.g., 545). Further, in one or more embodiments of the invention, the active document panel (e.g., 540) may include a "QuickZoom" control (e.g., 530) configured to quickly navigate to a particular area of the document (e.g., 545). For example, if the document (e.g., 545) is divided into logical sections, QuickZoom controls (e.g., 530) may be provided for quick navigation to one or more of the logical sections.

In one or more embodiments of the invention, the financial professional online interface (400) may include one or more project management controls (e.g. 525). Specifically, when providing remote financial assistance to a particular customer, information associated with that customer may be stored in a customer-specific project. Accordingly, in one or more embodiments of the invention, the project management control (e.g., 525) may be configured to save the current project, close the current project, open another project, or perform any other similar type of project-related function.

The financial professional online interface (400) may include many different types of controls. For example, the financial professional online interface (400) may include controls to display tips for providing remote financial assistance, record a current state of the document (e.g., 545) and/or project, enter notes associated with a customer and/or document (e.g., 545), check the document (e.g., 545) for errors (i.e., data entry errors if the document (e.g., 545) is editable), send a letter to the customer, view a billing status for the customer (e.g., based on the duration of a scheduled appointment slot), upload a document to the financial professional online interface (400), submit a document to a financial authority, or any other similar type of financial assistance-related functionality.

In one or more embodiments of the invention, one or more of the features of the financial professional online interface (400) described above may provide an efficient means for a financial professional to provide remote financial assistance. Specifically, features of the financial professional online interface (400) may reduce the amount of physical paperwork required, facilitate submission of financial information to a financial authority, provide convenient access to customer information, facilitate monitoring of remote financial assistance, and/or provide other improvements over face-to-face financial assistance not specifically described herein.

Figure 6:
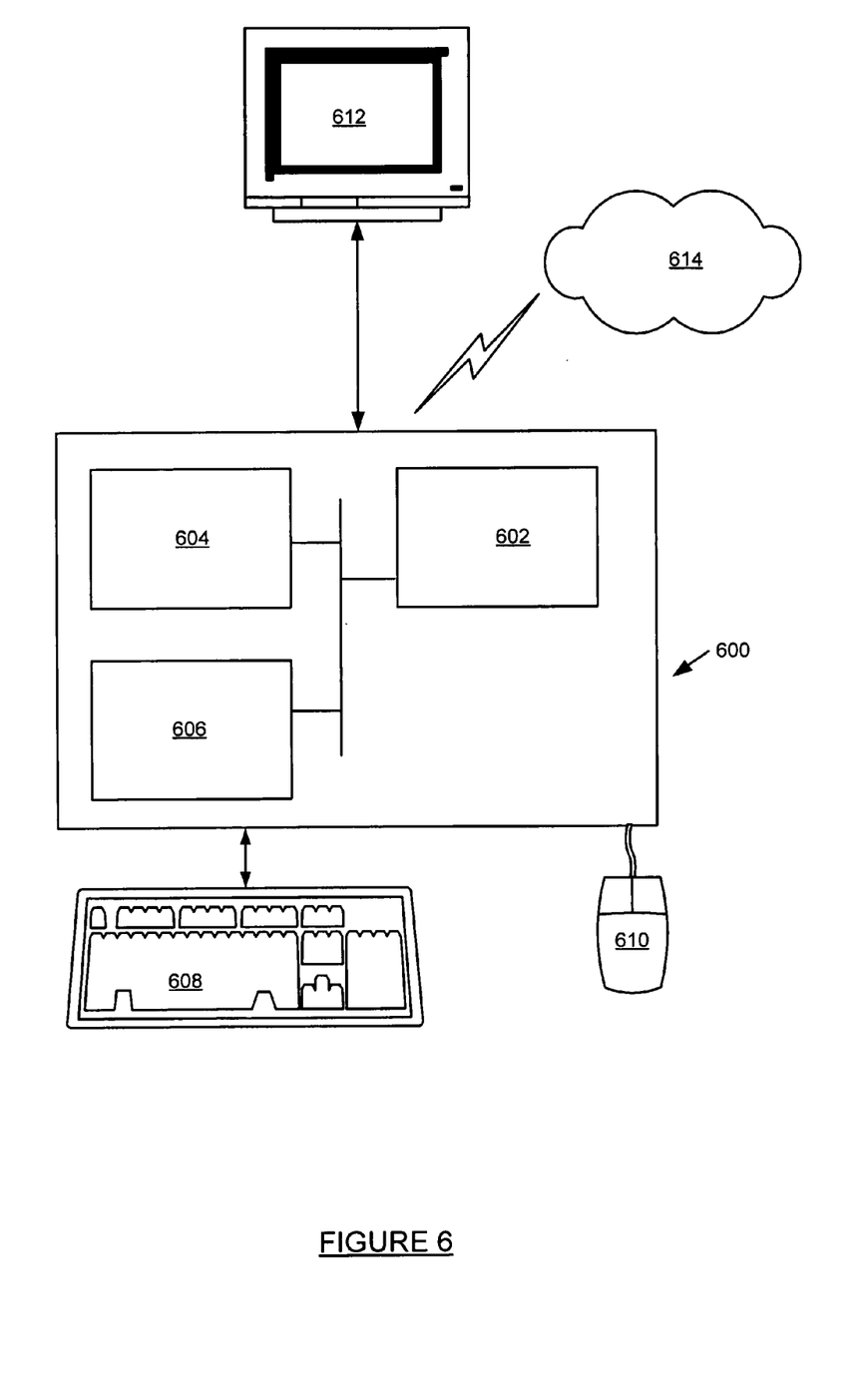
FIG. 6 shows a diagram of a computer system in accordance with one embodiment of the invention.

The invention may be implemented on virtually any type of computer regardless of the platform being used. For example, as shown in FIG. 6, a computer system (600) includes a processor (602), associated memory (604), a storage device (606), and numerous other elements and functionalities typical of today's computers (not shown). The computer (600) may also include input means, such as a keyboard (608) and a mouse (610), and output means, such as a monitor (612). The computer system (600) may be connected to a network (614) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (600) may be located at a remote location and connected to the other elements over a network. Further, the invention may be implemented on a distributed system having a plurality of nodes, where each portion of the invention (e.g., customer online interface, financial professional online interface, administrative interface, server arrangement, server, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing remote financial assistance, comprising:
    obtaining, by a computer processor, a tax help request from a customer for filing a tax return;
    collecting, by the computer processor and in response to the tax help request, financial information from the customer;
    assigning, by the computer processor and based on the financial information, the customer to a category;
    retrieving, by the computer processor, a list identifying a plurality of tax professionals specializing in the category;
    presenting, by the computer processor, the list and a plurality of appointment slots to the customer;
    receiving, by the computer processor and from the customer and after presenting the list, a selection of a tax professional of the plurality tax professionals;
    receiving, by the computer processor and from the customer, a selection of an appointment slot with the tax professional selected from the plurality of appointment slots;
    obtaining, by the computer processor, a tax document corresponding to the category and associated with the tax return;
    displaying, by the computer processor and during the appointment slot, the tax document within a tax professional online interface,
        wherein the tax professional provides remote financial assistance to the customer by inputting tax information associated with the customer into the tax document using the tax professional online interface.

2. The method of claim 1, further comprising:
    monitoring the remote financial assistance; and
    generating a monitoring record based on the monitoring.

3. The method of claim 2, further comprising:
    publishing the monitoring record to the tax professional online interface.

4. The method of claim 2, further comprising:
    storing the monitoring record in a plurality of monitoring records; and
    calculating a financial assistance metric based on the plurality of monitoring records.

5. The method of claim 4, further comprising:
    modifying the plurality of tax professionals based on the financial assistance metric, wherein modifying the plurality of tax professionals comprises one selected from a group consisting of increasing the plurality of tax professionals and decreasing the plurality of tax professionals.

6. The method of claim 1, wherein the plurality of appointment slots is filtered based on at least one workload backlog associated with at least one tax professional of the plurality of tax professionals.

7. The method of claim 1, wherein inputting the tax information comprises editing the tax information provided by the customer via a customer online interface.

8. The method of claim 1, wherein the appointment slot is scheduled based on a geographical location of the tax professional.

9. The method of claim 1, wherein the tax professional online interface comprises a web page.

10. A method for providing remote financial assistance to a customer, comprising:
   indicating, by a computer processor, a plurality of available appointment slots associated with a tax professional;
   obtaining, by a computer processor, from the customer, and via a tax professional online interface, a selection of an appointment slot from the plurality of available appointment slots,
      wherein the appointment slot is associated with a tax help request by the customer for the tax professional to assist with filing a tax return;
   obtaining, by the computer processor, a tax document associated with the tax return, wherein the tax document is displayed on the tax professional online interface; and
   providing, by the computer processor and during the appointment slot, remote financial assistance to the customer by inputting tax information associated with the customer into the tax document using the tax professional online interface.

11. The method of claim 10, wherein the remote financial assistance comprises a telephone connection with the customer.

12. The method of claim 11, wherein the telephone connection comprises a Voice-over-Internet Protocol (VoIP) connection.

13. The method of claim 12, wherein the tax professional online interface comprises the VoIP connection.

14. The method of claim 10, wherein inputting the tax information comprises editing the tax information provided by the customer via a customer online interface.

15. The method of claim 10, wherein the tax professional online interface comprises a web page.

16. A system comprising:
   a computer server arrangement configured to:
      obtain a tax help request from a customer for filing a tax return;
      collect, in response to the tax help request, financial information from the customer;
      assign based on the financial information, the customer to a category;
      retrieve a list identifying a plurality of tax professionals specializing in the category;
      present the list and a plurality of appointment slots to the customer;
      receive, from the customer and after the list is presented, a selection of a tax professional of the plurality of tax professionals;
      receive, from the customer, a selection of an appointment slot with the tax professional selected from the plurality of appointment slots; and
   a financial professional online interface configured to:
      receive tax information input, and
      display, during the appointment slot, a tax document corresponding to the category and associated with the tax return,
         wherein the tax professional provides remote financial assistance to the customer by inputting tax information associated with the customer into the tax document using the tax professional online interface.

17. A graphical user interface executed by a computer processor for displaying an online interface comprising:
   a schedule panel comprising scheduled appointment information,
      wherein the scheduled appointment information comprises a scheduled appointment slot with a tax professional selected from a plurality of available appointment slots,
      wherein the scheduled appointment slot is associated with a tax help request from a customer for filing a tax return,
      wherein the tax professional is chosen by the customer from a plurality of tax professionals specializing in a category of the customer, and
      wherein the category is assigned to the customer based on financial information obtained from the customer; and
   an active document panel displaying a tax document corresponding to the category and associated with the tax return,
      wherein the tax professional provides remote financial assistance to the customer, in the scheduled appointment slot, by inputting tax information into.

18. A non-transitory computer readable medium comprising executable instructions for providing remote financial assistance by:
   obtaining a tax help request from a customer for filing a tax return;
   collecting, in response to the tax help request, financial information from the customer;
   assigning, based on the financial information, the customer to a category;
   retrieving a list identifying a plurality of tax professionals specializing in the category;
   presenting the list of tax professionals and a plurality of appointment slots to the customer;
   receiving, from the customer and after presenting the list, a selection of a tax professional of the plurality of tax professionals;
   receiving, from the customer, a selection of an appointment slot with the tax professional selected from the plurality of appointment slots;
   obtaining a tax document corresponding to the category and associated with the tax return;
   displaying, during the appointment slot, the tax document within a tax professional online interface,
      wherein the tax professional provides remote financial assistance to the customer by inputting tax information associated with the customer into the tax document using the tax professional online interface.

19. A non-transitory computer readable medium comprising executable instructions for providing remote financial assistance to a customer by:
   indicating a plurality of available appointment slots associated with a tax professional;

obtaining, from the customer and via a tax professional online interface, a selection of an appointment slot selected from the plurality of available appointment slots,
   wherein the appointment slot is associated with a tax help request by the customer for the tax professional to assist with filing a tax return;
obtaining a tax document associated with the tax return, wherein the tax document is displayed on the tax professional online interface; and
   providing, during the appointment slot, remote financial assistance to the customer by inputting tax information associated with the customer into the tax document using the tax professional online interface.

\* \* \* \* \*